United States Patent
Zellner et al.

(10) Patent No.: US 7,406,710 B1
(45) Date of Patent: Jul. 29, 2008

(54) SYSTEM AND METHOD FOR CONTROLLING DEVICES AT A LOCATION

(75) Inventors: Samuel N. Zellner, Dunwoody, GA (US); Mark J. Enzmann, Roswell, GA (US); Robert T. Moton, Jr., Alpharetta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 735 days.

(21) Appl. No.: 09/750,104

(22) Filed: Dec. 29, 2000

(51) Int. Cl.
*G06F 21/00* (2006.01)
*H04L 9/00* (2006.01)
*H04M 11/04* (2006.01)

(52) U.S. Cl. .................. 726/14; 713/169; 713/175; 379/45

(58) Field of Classification Search ............... 713/202; 725/105; 340/506, 521, 539.25, 541, 539.16; 709/250, 225
See application file for complete search history.

(56) References Cited

U.S. PATENT DOCUMENTS

| | | | |
|---|---|---|---|
| 4,918,717 A | | 4/1990 | Bissonnette et al. |
| 5,717,379 A | * | 2/1998 | Peters .................. 340/539.25 |
| 5,812,054 A | | 9/1998 | Cohen ........................ 379/38 |
| 6,012,100 A | * | 1/2000 | Frailong et al. ............ 709/250 |
| 6,094,134 A | | 7/2000 | Cohen ........................ 379/37 |
| 6,131,120 A | * | 10/2000 | Reid .......................... 709/225 |
| 6,154,123 A | * | 11/2000 | Kleinberg .................. 340/436 |
| 6,167,255 A | * | 12/2000 | Kennedy et al. .......... 455/414.1 |
| 6,196,846 B1 | * | 3/2001 | Berger et al. ................ 434/118 |
| 6,246,320 B1 | * | 6/2001 | Monroe ...................... 340/506 |
| 6,271,752 B1 | * | 8/2001 | Vaios ......................... 340/541 |
| 6,314,177 B1 | * | 11/2001 | Davis et al. ............ 379/265.12 |
| 6,317,042 B1 | * | 11/2001 | Engelhorn et al. ..... 340/539.16 |
| 6,349,290 B1 | * | 2/2002 | Horowitz et al. ............. 705/35 |
| 6,442,241 B1 | | 8/2002 | Tsumpes |
| 6,545,601 B1 | * | 4/2003 | Monroe ...................... 340/521 |
| 6,553,100 B1 | | 4/2003 | Chen et al. |

(Continued)

OTHER PUBLICATIONS http://java.sun.com/j2se/1.5.0/docs/guide/security/cert3.html.*

(Continued)

*Primary Examiner*—Christopher A Revak
(74) *Attorney, Agent, or Firm*—Cantor Colburn LLP

(57) ABSTRACT

A system and method for controlling, by an outside entity, one or more devices associated with a location. A representative embodiment of the system architecture comprises an internal computer system through which a device may be remotely controlled by the outside entity during a communication session between the outside entity and the internal computer system through an external computer network. The external computer network can be the Internet. When the outside entity is requested to control the device, the outside entity's identity information is authenticated before the communication session is established. In a preferred embodiment, the internal computer system is protected by a firewall. The firewall allows the outside entity to access the internal computer system to control the device if the outside entity can provide proper identity information. The identity information of the outside entity may be a password that is recognized by the firewall. In the preferred embodiment, the identity information is a digital certificate issued to the outside entity by a certificate authority. In preferred embodiments, after the communication session is established, only the outside entity can terminate the communication session.

14 Claims, 8 Drawing Sheets

U.S. PATENT DOCUMENTS

| | | | |
|---|---|---|---|
| 6,563,910 B2 | 5/2003 | Menard et al. | |
| 6,567,502 B2 | 5/2003 | Zellner et al. | |
| 6,650,901 B1 * | 11/2003 | Schuster et al. | 455/456.1 |
| 6,687,424 B1 * | 2/2004 | Gerdt et al. | 385/12 |
| 6,698,021 B1 * | 2/2004 | Amini et al. | 725/105 |
| 6,748,052 B2 | 6/2004 | Zellner et al. | |
| 6,792,263 B1 * | 9/2004 | Kite | 455/412.1 |
| 6,868,074 B1 * | 3/2005 | Hanson | 370/328 |
| 6,889,321 B1 * | 5/2005 | Kung et al. | 713/153 |
| 6,937,869 B1 * | 8/2005 | Rayburn | 455/457 |
| 7,010,097 B2 * | 3/2006 | Zellner et al. | 379/45 |
| 7,099,332 B2 * | 8/2006 | Leung | 370/395.42 |
| 2002/0075844 A1 * | 6/2002 | Hagen | 370/351 |
| 2002/0150050 A1 * | 10/2002 | Nathanson | 370/241 |
| 2003/0046689 A1 * | 3/2003 | Gaos | 725/34 |
| 2004/0086093 A1 * | 5/2004 | Schranz | 379/37 |
| 2004/0202290 A1 | 10/2004 | Zellner et al. | |
| 2005/0089052 A1 * | 4/2005 | Chen et al. | 370/401 |
| 2006/0143700 A1 * | 6/2006 | Herrmann | 726/14 |

OTHER PUBLICATIONS

"Wireless Application Protocol", Oct. 1999 Wireless Internet Today, pp. 1-20.

"Home Wireless Networks, Inc.", The International Engineering Consortium, pp. 1-21 available at http://www.iec.org, Web ProForum Tutorials.

Chatschik Bisdikian, et al., "Bluetooth Protocol Architecture", Version 1.0, Sep. 29, 1999, pp. 1-20.

An online article entitled, "Samsung integrate digital camera and phone", published on Jul. 1, 2000, and retrieved from http:/wwww.dpreview.com/news/0007/00070101samsungdigiphone.asp on Oct. 10, 2002—2 pages.

Lough et al., "A Short Tutorial on Wireless LANs and IEEE 802.11", retrieved from hhtp://computer.org/student/looking/summer97/ieee802.htm on Oct. 10, 2002—5 pages.

U.S. Appl. No. 10/833,804 filed Apr. 28, 2004, entitled "Multimedia Emergency Services", Inventor, Zellner, et al.

\* cited by examiner

SYSTEM AND METHOD FOR CONTROLLING DEVICES AT A LOCATION

BACKGROUND

1. Field of the Invention

The present invention relates to telecommunication systems, and in particular, to a system and method for controlling devices at a location.

2. Background of the Invention

Emergency telephone services are implemented throughout the world to receive calls that report emergency situations. In the United States, when a caller dials 911, the emergency call is routed to a public safety answering point (PSAP), which dispatches emergency response professionals. The emergency response professionals may include police officers, fire fighters, and paramedics. The PSAP receives from the caller critical information such as the location of the emergency, the type of emergency, and whether anyone is in imminent danger.

FIG. 1 is a schematic diagram showing a prior art system architecture of a 911 service in the United States. The 911 service is initiated when a caller at location 100 uses telephone 102 associated with telephone line 104 to dial the number string "911." The emergency call or the 911 call is automatically routed by public switched telephone network (PSTN) 106 to PSAP 108, which is usually operated by police, fire, or other emergency response professionals. The communication between the caller and PSAP 108 is a POTS (plain old telephone service) voice session.

Unlike regular telephone connections between a caller and a called party in which both parties have control over the connection, control of a 911 call rests exclusively with the called party, in this case PSAP 108. The caller of a 911 call, after establishing the POTS session, cannot terminate the session. That is, once the call is connected, only PSAP 108 could end the call, usually after the emergency has been adequately resolved. This unique feature of 911 calls is necessary to ensure that the POTS session remains intact, even if the caller accidentally hangs up telephone 102, but picks up telephone 102 again at a later time, until the emergency is resolved.

Another feature of emergency telephone services is the capability of identifying the caller's location, i.e., location 100. For wireline telephones, the telephone service provider or PSAP 108 can maintain a 911 database, e.g., database 110, cataloging the street address for every telephone line in the area for which PSAP 108 is responsible. Referring to FIG. 1, when a 911 call is made using telephone 102, the street address at which the 911 call originated, i.e., the street address of location 100, can be retrieved from database 110 based on the calling party number ("CgPN") of telephone line 104 that was used to initiate the call. In other words, the telephone number of telephone line 104 is related to the street address of location 100 in database 110. Database 110 may be hereinafter referred to as the 911 database. For 911 calls initiated by wireless telephones, several means for determining the calling party's location are being implemented in accordance with the Federal Communications Commission (FCC)'s Enhanced 911 (E911) mandate.

The emergency telephone services known in the art today are limited to voice communications such as the POTS session described above. In the future, however, multimedia communication sessions, including data sessions, will be more prevalent. Multimedia communication sessions could be established using, for example, integrated voice, data and video services such as those available with digital subscriber line (DSL), broadband integrated services digital networks (B-ISDN), and the like. A person could have an internal computer system within his or her "multimedia capable" home. The internal computer system may be a local area network (LAN) having a number of component systems. The internal computer system can communicate with outside entities. The communication between the internal computer system and the outside entities may be via an external computer network. The external computer network may be, for example, the Internet.

Although the internal computer system can communicate with the outside entities using PSTN 106, the internal computer system may not be fully integrated with PSTN 106. That is, if a caller places a 911 call using the internal computer system over the voice-over-Internet protocol (VoIP), even though PSAP 108 can communicate with the caller, it cannot control the call, i.e., PSAP 108 does not have exclusive control over the VoIP communication session. As a result, the caller's communication with PSAP 108 could be disconnected prematurely before PSAP 108 could adequately assess the emergency situation. Thus, a vital capability of emergency telephone services is not available for the subscriber when he calls PSAP 108 using a non-POTS technology.

FIG. 2 is a schematic diagram showing a prior art system architecture of a private security system. Location 200 may be a private residence or a commercial building. Location 200 has telephone 202 that is associated with telephone line 204. Location 200 is equipped with security system 212, which may be more commonly known as the burglary alarm system. Security system 212 may include, for example, one or more sensing apparatus such as a motion detector or glass-break sensor. When one sensing apparatus is triggered, security system 212 can use telephone line 204 to contact private security firm 214 via PSTN 106. Private security firm 214 would then attempt to verify whether the triggering event warrants a dispatch of emergency response professionals. For example, private security firm 214 might call someone associated with location 200 to determine whether the triggering event was a false alarm, a minor accident for which no emergency response team is needed, or another non-life-threatening incident.

If private security firm 214 cannot verify that the triggering event is not a non-life-threatening incident, private security firm 212 calls PSAP 108 to report the emergency. More often than not, however, the call to PSAP 108 is unnecessary. For example, one of the sensing apparatus might have been triggered accidentally. For example, it is known that loud thunder could cause a glass-break sensor to go off, thereby dispatching the police to location 200 unnecessarily, and resulting in wasted resources.

Technologies associated with the existing 911 service and private security system, as they exist today, are adequate to receive calls that report emergency situations. These existing technologies, however, have a number of shortcomings. First, as discussed above, the existing technologies do not give VoIP emergency calls the same level of protection as calls received from POTS callers. Second, PSAP 108 does not have means for assessing, monitoring, resolving, or otherwise handling an emergency situation other than receiving second-hand information about the emergency situation from the caller. Third, emergency response personnel and equipment are often dispatched to the emergency scene without knowing what emergency response equipment or personnel are required. Fourth, valuable resources are often wasted when emergency response personnel and equipment are dispatched to situations that could have been resolved without the dispatch. Fifth, private security firms cannot adequately prescreen or verify reported emergency situations before dispatching the police or other emergency response team to the scene.

SUMMARY OF THE INVENTION

The present invention is a system and method for controlling one or more devices associated with a location by an outside entity. The outside entity may be an emergency response unit, a private security firm, or a healthcare provider as described in specific embodiments discussed below. The location may be a premises, a vehicle, or a person. Examples of the one or more devices can include a camera, a sprinkler system, or even a pacemaker surgically placed on a person. The system architecture of one embodiment of the present invention comprises an internal computer system through which the device may be remotely controlled. The internal computer system may be a LAN. The internal computer system may also be a Bluetooth-enabled system.

When the outside entity is requested to control the device, a multimedia communication session between the internal computer system and the outside entity is established through an external computer network. The external computer network is preferably the Internet. The request for the outside entity may be made by a caller associated with the location using one of several methods, including through POTS and VoIP telephone calls. The communication session between the internal computer system and the external computer network can use one of several communications protocols. Suitable communication protocols include the digital communications protocol (DCP) and the transmission control protocol (TCP).

In a preferred embodiment, the internal computer system is protected by a firewall. The firewall allows the outside entity to access the internal computer system to control the device if the outside entity can provide proper identity information. The identity information of the outside entity may be a password that is recognized by the firewall. In the preferred embodiment, the identity information is a digital certificate issued to the outside entity by a certificate authority. The digital certificate can be authenticated by the certificate authority before the outside entity is allowed to access the internal computer system.

When a secured tunnel through the firewall is created to enable the outside entity to access the internal computer system, the outside entity can control the device that is associated with the internal computer system. The outside entity can use the device to observe a situation at the location. The outside entity can also use the device to resolve the situation, as appropriate. When the situation is resolved, the communication session between the internal computer system and the external computer network is terminated.

In a preferred embodiment, the outside entity has exclusive control over the communication session after the communication session is established. In other words, only the outside entity can terminate the communication session. The exclusive control allows the outside entity to resolve the situation without interruption of the communication session by other parties, including the internal computer system.

In a preferred embodiment, each of the internal computer system and the outside entity is issued a digital certificate by a certificate authority. Before the secured tunnel through the firewall is created, the certificate authority must authenticate the digital certificates. This process ensures that the internal computer system and the outside entity are communicating with known parties. More importantly, this process can help protect privacy. In an embodiment in which the present invention is used to provide healthcare services, this authentication process can ensure that medical treatment is not provided to a wrong patient.

Accordingly, it is an object of the present invention to provide a secured method for an outside entity to remotely control devices at a location.

It is another object of the present invention to enable an outside entity to resolve a situation at a location before dispatching emergency response professionals to the location.

It is another object of the present invention to enable an emergency response unit to fully observe an emergency situation before dispatching emergency response professionals to the location.

These and other objects of the present invention are described in greater detail in the detailed description of the invention, the appended drawings, and the attached claims.

DETAILED DESCRIPTION OF THE INVENTION

Figure 3:
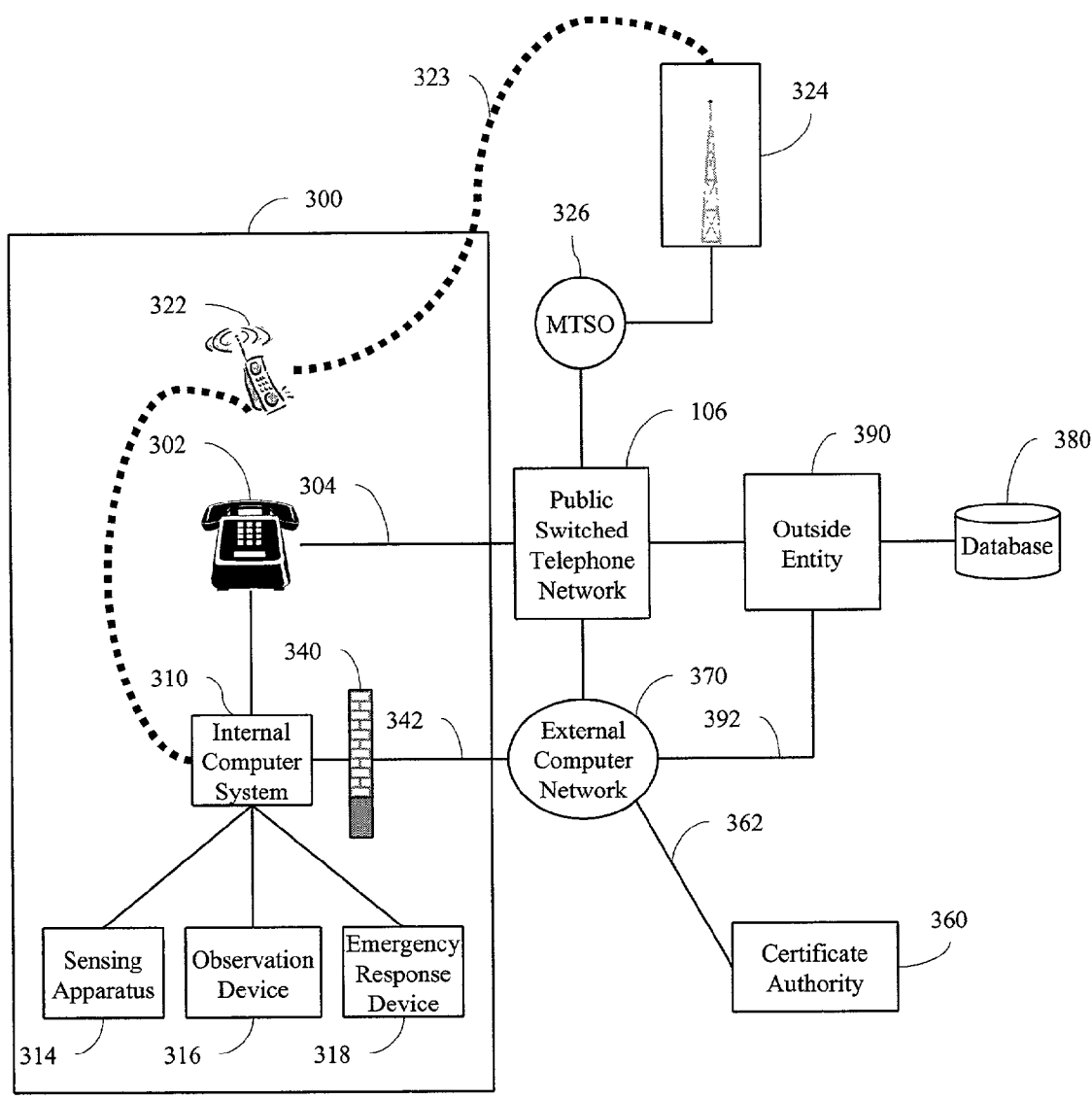
FIG. 3 is a schematic diagram showing a general system architecture of an embodiment of the present invention.

FIG. 3 is a schematic diagram showing a general system architecture of an embodiment of the present invention. Location 300 may be any location at which internal computer system 310 may be equipped to control, operate, supervise or otherwise manipulate a number of component systems. Location 300 may be, for example, a home, an office building, or a moving object such as a yacht or an automobile.

The component systems associated with internal computer system 310 may include sensing apparatus 314, observation device 316, and emergency response device 318. Sensing apparatus 314 may be one of several motion detectors commonly available in the market. Observation device 316 may be a commonly available video camera or a more sophisticated surveillance camera. Emergency response device 318 may be a sprinkler system that can be activated by internal computer system 310. Other component systems that can be associated with internal computer system 310 can include heating, ventilation, and air conditioning systems, telephone systems, etc.

Through internal computer system 310, each of the component systems at location 300 is networked to each other so that the component systems can work together. For example, a first action by a first component system can activate a second component system to perform a second action through internal computer system 310. Internal computer system 310 may be a single computer. Internal computer system 310 may also be a LAN.

Firewall 340 can protect internal computer system 310 from unauthorized access by external entities. For example, firewall 340 can protect internal computer system 310 from undesirable access by outside entity 390 via communication links 392 and 342. Communication link 342 may be a telephone line, a DSL, a T1 line, a T3 line, a B-ISDN line, and the like. Firewall 340 can allow a user of internal computer system 310 to access external computer network 370, while also preventing crackers, hackers or others on external computer network 370 from accessing internal computer system 310. External computer network 370 may be, for example, the Internet.

Firewall 340 can comprise a combination of hardware and software that is built using routers, servers, and a variety of software. Firewall 340 can be simple or complex, depending on the desired levels of security. Firewall 340 can have a number of elements including, for example: (1) an internal screening router (sometimes called a choker router) used to provide packet filtering; (2) a bastion host or a proxy server used as a go-between to maintain security and log all traffic between internal computer system 310 and external computer network 370; and (3) an exterior screening router used to provide an extra level of protection if the internal screening router fails.

Figure 1:
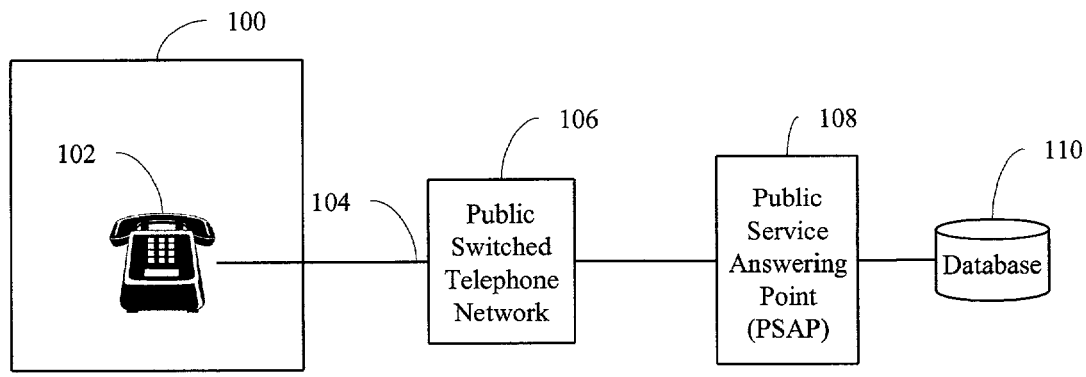
FIG. 1 is a schematic diagram showing a prior art system architecture of a 911 service in the United States.
Figure 2:
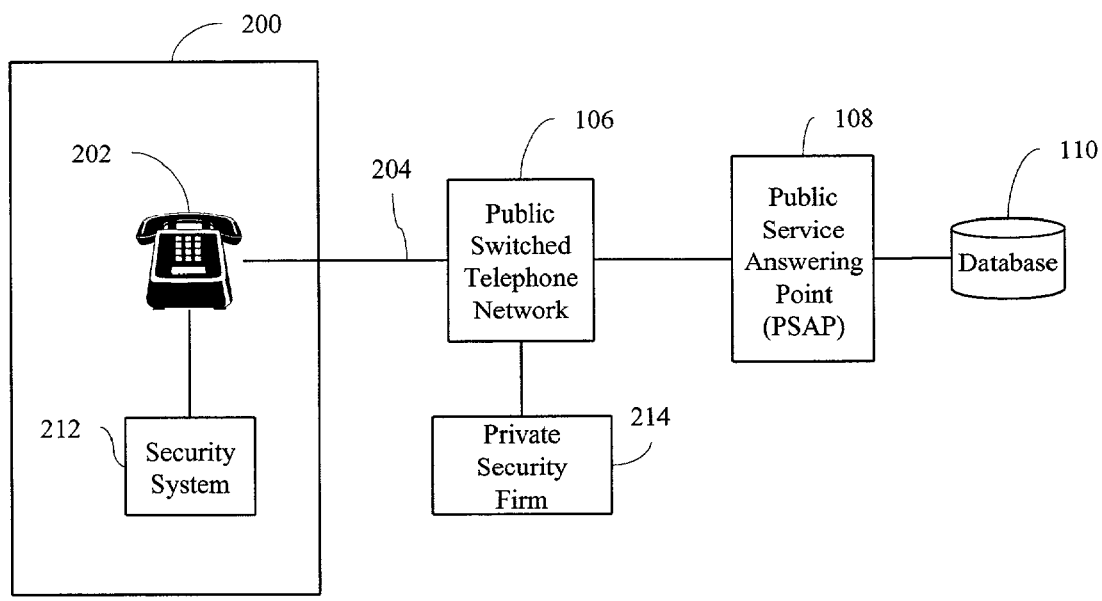
FIG. 2 is a schematic diagram showing a prior art system architecture of a private security system.

Telephone 302 is an example of customer premises equipment (CPE) that can use telephone line 304 to make POTS calls via PSTN 106 to outside entities, including outside entity 390. Outside entity 390 may be an emergency response unit such as PSAP 108 of FIGS. 1 and 2. Outside entity 390 may also be a private security firm, such as private security firm 214 of FIG. 2. Wireless device 322 can also contact outside entity 390. For example, wireless device 322 may be a wireless telephone that can communicate with outside entity 390 using wireless communication link 323 through base station 324 and mobile telephone switching office (MTSO) 326.

Database 380 is accessible by outside entity 390. Database 380 can contain information that is typically found in a 911 database, such as database 110 shown in FIG. 1 and as described in the background section above. For example, database 380 can contain, among other information, the street address of location 300. In addition, database 380 may also comprise other information such as a profile of location 300, including without limitation, the Internet Protocol (IP) address of internal computer system 310. Furthermore, database 380 may comprise additional information related to each of the component systems. Database 380 also preferably has information related to the physical layout of each of the component systems at location 300, and instructions for operating them remotely. More importantly, database 380 may also comprise medical profiles of residents of location 300.

In addition, database 380 can contain additional information related to how 1U outside entity 390 may be authorized to access internal computer system 310. Specifically, database 380 can comprise information related to how outside entity 390 may establish a secured tunnel through firewall 340 on communication link 342. For example, database 380 can contain identity information of outside entity 390. The identity information may be a password, an access code, or a key. The identity information is preferably issued to outside entity 390 by internal computer system 310. The identity information can also be a digital certificate issued by certificate authority 360. The identity information can be used by outside entity 390 to go through firewall 340 to access internal computer system 310. Preferably, database 380 can be enhanced with information related to public key infrastructure (PKI). The PKI can have the following capabilities:

1. Authenticate identity. Digital certificates issued as part of the PKI can allow individual users, organizations, and website operators to confidentially validate the identity of each party in an Internet transaction.
2. Verify integrity. A digital certificate can ensure that the message or document that the certificate "signs" has not been changed or corrupted in transit online.
3. Ensure privacy. The digital certificates can protect information from interception during Internet transmission.
4. Authorize access. The digital certificates can replace easily guessed and frequently lost user IDs and passwords to streamline intranet log-in security and they can reduce management information system (MIS) overhead.
5. Authorize transactions. With PKI solutions, an enterprise can control access privileges for specified online transactions.
6. Support for nonrepudiation. The digital certificates can validate their users' identities, making it nearly impossible to later repudiate a digitally "signed" transaction, such as a purchase made on a website.

The digital certificates associated with the PKI can be issued and/or authenticated by certificate authority 360. To get a digital certificate, outside entity 390 and/or internal computer system 310 can visit certificate authority 360, preferably, via external computer network 370 on communication link 362, and request the certificate. The user's name and other identifying information are typically required to obtain the digital certificate. The digital certificate can be digitally signed to guarantee its authenticity. The digital certificate is unique to the user and it can be put on a memory (e.g., hard disk) of a computer, along with a private key. The digital certificate can comprise the name of the user, the name of certificate authority 360, the unique serial number of the certificate, the version number of the certificate, the expiration date of the certificate, the user's public key, and the digital signature of certificate authority 360. The exact format of the digital certificate can be defined by a standard. The standard may be the well-known X.509 standard.

A communication session between internal computer system 310 and outside entity 390 may be established via external computer network 370, along communication link 342 and 392. The communication session can be a multimedia session that uses one of several communications protocols. For example, Digital Communications Protocol (DCP) or Transmission Control Protocol (TCP) may be used in conjunction with Internet Protocol (IP). Using the PKI described above, the communication session between internal computer system 310 and outside entity 390 can be established as a secured tunnel through firewall 340.

One or both of internal computer system 310 and outside entity 390 can initiate the creation of the secured tunnel. Furthermore, the secured tunnel can be created as a result of the establishment of a POTS or VoIP session initiated by a caller associated with location 300. For example, the system of the present invention can be adapted such that when the telephone number of outside entity 390 is dialed on telephone 302 or wireless device 322, the dialing of the telephone number can serve as an instruction for internal computer system 310 to establish the communication session with outside entity 390. Similarly, outside entity 390 can initiate the communication session, via communication link 342, with internal computer system 310 when outside entity 390 is contacted by the caller associated with location 300. Outside entity 390 can retrieve information related to location 300, e.g., the IP address of internal computer system 310, from database 380. During the communication session, outside entity 390 can control one or more of the component systems (including sensing apparatus 314, observation device 316, and emergency response device 318). The scope of the control can be regulated by firewall 340.

In preferred embodiments of the present invention, control of the communication session after the communication session is established, can rest exclusively with outside entity 390. In other words, once the communication session is established between internal computer system 310 and outside entity 390, only outside entity 390 can terminate the communication session.

In light of the above disclosure, it is clear that a large number of embodiments may be implemented for the present invention. For the purposes of demonstration, three specific examples of how the present invention may be implemented are discussed below. Although the following examples best illustrate the present invention, one of ordinary skill in the art would appreciate that other embodiments are possible in light of the disclosure. In addition, while the system operation described herein and illustrated in the diagrams and flowcharts contains many specific details, these specific details should not be construed as limitations on the scope of the invention, but rather as examples of how preferred embodiments of the invention may be implemented. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

Figure 4:
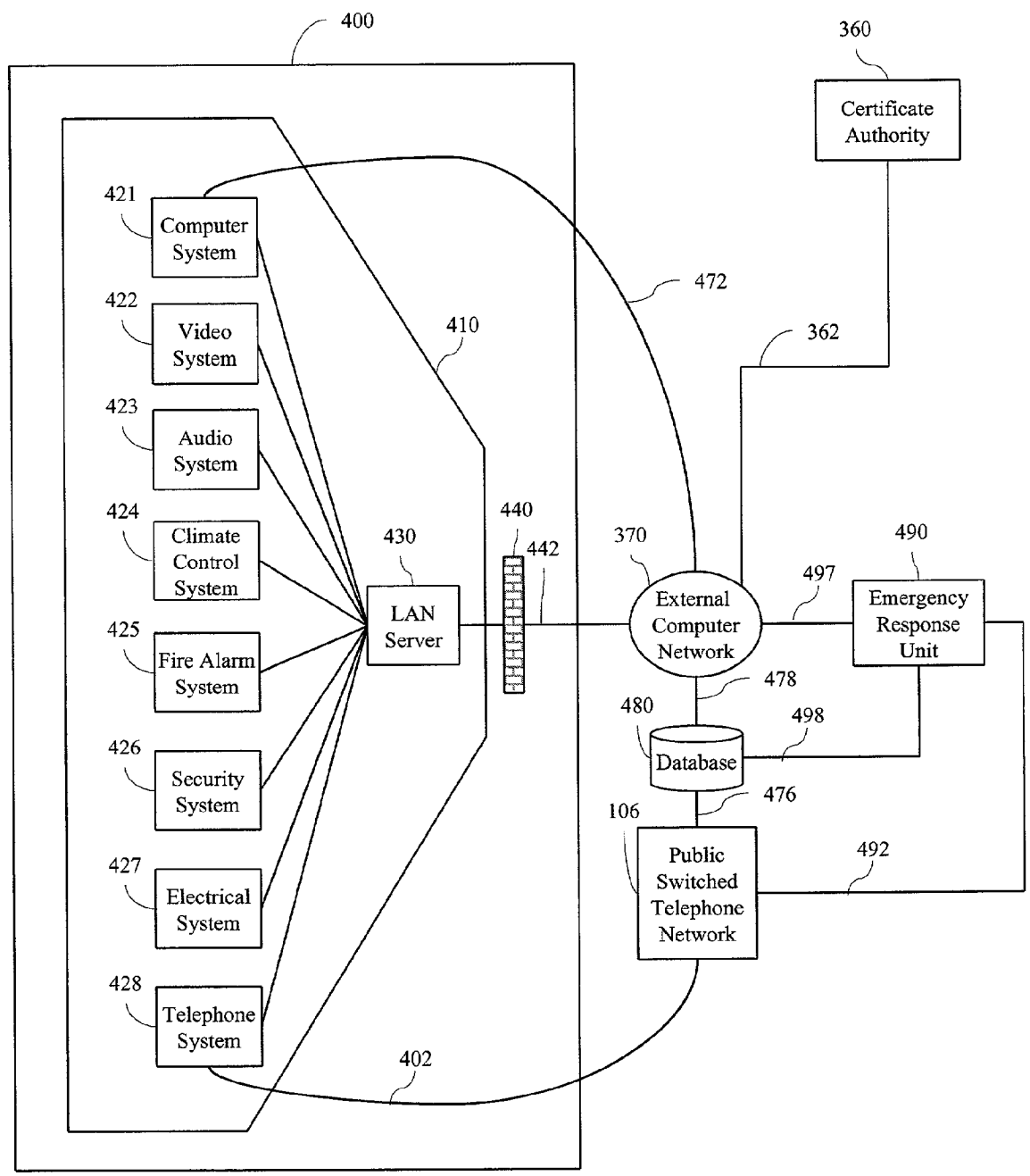
FIG. 4 is a schematic diagram illustrating the system architecture of a first preferred embodiment of the present invention.

FIG. 4 is a schematic diagram illustrating the system architecture of a first preferred embodiment of the present invention. Location 400 may be a residential unit, an office building, a boat, an automobile, or any location at which a LAN may be set up. LAN 410 can be similar to internal computer system 310 described above for FIG. 3. LAN 410 can comprise LAN server 430, which can control, operate, supervise, and otherwise manipulate all component systems that are associated with LAN 410. The component systems may include, for example, computer system 421, video system 422, audio system 423, climate control system 424, fire alarm system 425, security system 426, electrical system 427, and telephone system 428.

Computer system 421 may comprise one or more desktop computers, mainframe computers, laptop computers, and any other peripherals including, without limitation, printers, scanners, cameras, microphones, and speakers. Video system 422 may include cameras, television sets, and video cassette recorders. Examples of audio system 423 may be stereos, compact disk players, and intercoms. Climate control system 424 may include heating, ventilation, and air conditioning units installed at location 400, and the associated sensors, thermostats, and water heaters. Fire alarm system 425 may comprise, for example, fire alarm units and sprinkler systems. Security system 426 may include, among other things, motion detectors, surveillance cameras, glass-break sensors, as well as others sensors normally included as part of a security system. Electrical system 427 can operate all electrical equipment and appliances that are installed at location 400 including microwaves, baby monitors, refrigerators, photocopying machines, and vacuums. Telephone system 428 includes all CPE that can communicate with PSTN 106 including wireline telephones, wireless telephones, and facsimile machines.

Through LAN server 430, each of the component systems associated with LAN 410 can communicate and share resources with other component systems. For example, video system 422 and security system 426 may share common cameras on their systems. In addition, security system 426 and telephone system 428 may work together to report or record a suspicious activity observed at location 400 via PSTN 106. Furthermore, electrical system 427 and computer system 421 may work together to communicate with external computer network 370 so that an appliance on electrical system 427 may be controlled remotely by the owner of location 400 via external computer network 370. LAN server 430 may also manipulate other systems not shown in FIG. 4 so long as the other systems are part of LAN 410 and connected to LAN server 430.

LAN server 430 can be protected by firewall 440 to prevent unauthorized access by external entities via communication link 442. Communication link 442 can be a DSL, a T1 line, a T3 link, a B-ISDN line and the like. Firewall 440 may comprise one or more elements as described above for firewall 340 of FIG. 3. To go through firewall 440, an outside entity such as emergency response unit 490 can be required to provide identity information. The identity information can be a key, an access code, or a password. Emergency response unit 490 may be a PSAP. The identity information can be issued to emergency response entity 490 by LAN server 430.

Preferably, identity information comprising a properly authenticated digital certificate is required before any external entity is allowed to communicate with LAN server 430. For example, emergency response unit 490 must supply its digital certificate authenticated by certification authority 360 before it can communicate with LAN server 430. A secured tunnel through firewall 440 may be established after certificate authority 360 authenticates the digital certificate of emergency response unit 490. Similarly, emergency response unit 490 may require LAN server 430 to supply the latter's digital certificate before emergency response unit 490 would operate any of the component systems associated with LAN 410. Emergency response entity 490 can communicate with LAN server 430 via external computer network 370 on communication links 497 and 442. Certificate authority 360 can be contacted via external computer network 370 using communication link 362.

Database 480 can be similar to database 380 of FIG. 3. In this embodiment, information related to LAN 410 can by supplied by the owner of LAN 410 to database 480 using any one of several methods. For example, the information may be supplied through a POTS session by the owner using telephone system 428 via PSTN 106 on communication links 402 and 476. Similarly, the information related to LAN 410 may be supplied by the owner through a VoIP session by computer system 421 via external computer network 370 on communication links 472 and 478. The information related to LAN 410 can be retrieved by emergency response unit 490 using communication link 498. Emergency response entity 490 can communicate with external computer network 370 and PSTN 106 using communication links 497 and 492, respectively. The communication on any of communication links 442, 362, 478, 497, and 498 may use any suitable communications protocol. For example, one of DCP and TCP may be used.

The system of the present invention can be adapted such that when emergency response unit 490 is contacted by the owner using one or both of computer system 421 and telephone system 428, either LAN server 430 or emergency response unit 490 can initiate a communication session using communication link 442 via external computer network 370. In other words, the very act of the owner of LAN 410 contacting emergency response unit 490 can give emergency response unit 490 the permission to control one or more component systems associated with LAN 410. Firewall 440 can be adapted so that emergency response unit 490 can have control over LAN 410 through a secured tunnel. Firewall 440 can also be adapted to provide emergency response unit 490 different levels of access or security. In one example, emergency response unit 490 may have control over one system component of LAN 410. In an extreme example, emergency response unit 490 may have exclusive, unhindered, total control over all component systems of LAN 410.

Figure 5:
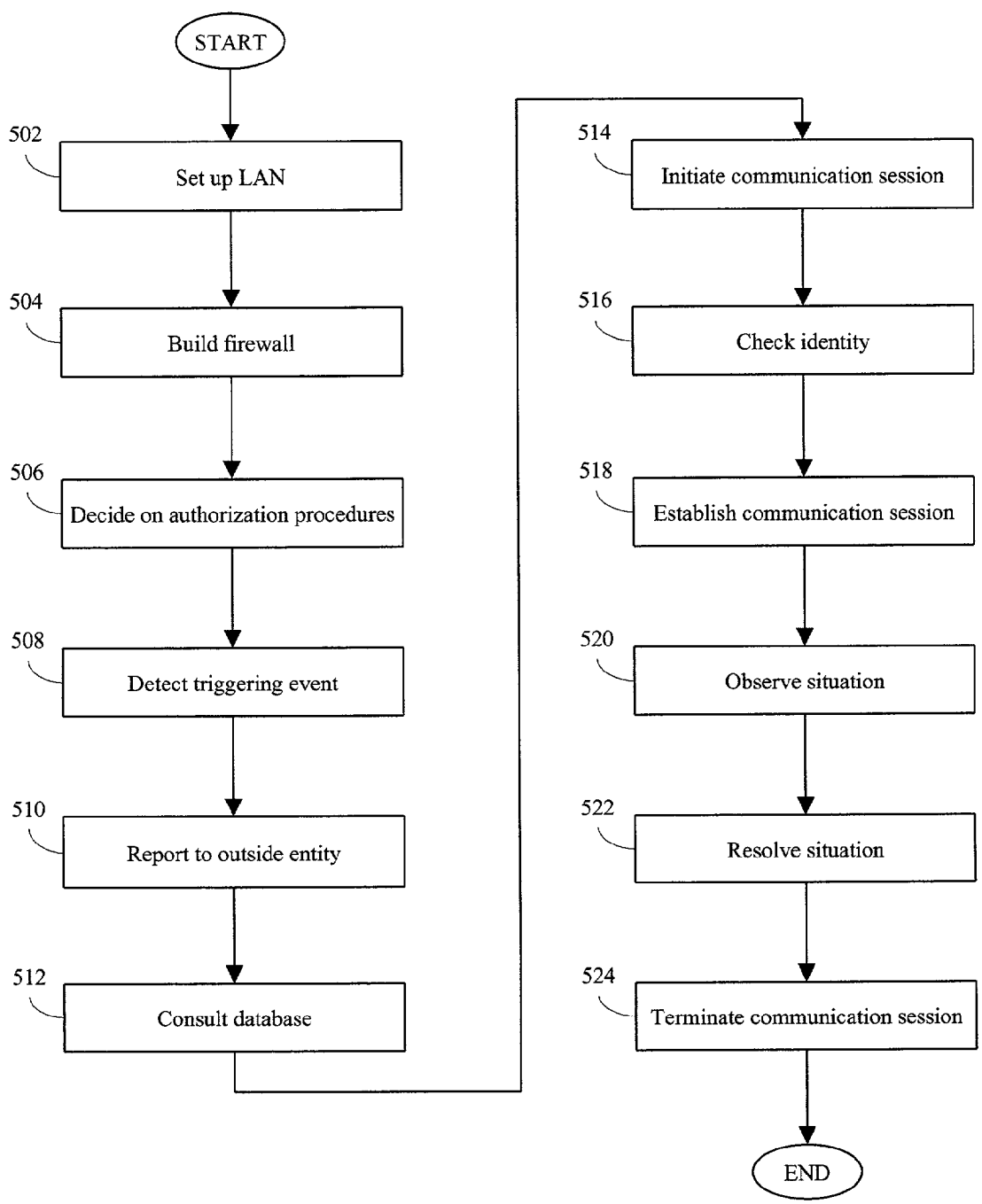
FIG. 5 is a flowchart illustrating the steps involved in using the first preferred embodiment of the present invention.

FIG. 5 is a flowchart illustrating the steps involved in using the first preferred embodiment of the present invention. In step 502, LAN 410 can be set up at location 400 as described above. For example, LAN 410 can comprise LAN server 430 that is in communication with various component systems associated with LAN 410, including computer system 421, video system 422, audio system 423, climate control system 424, fire alarm system 425, security system 426, electrical system 427, and telephone system 428. A component or device of each of these component systems may function as one or more of sensing apparatus, observation devices, and emergency response devices. A sensing apparatus can cause LAN server 410 to contact emergency response unit 490 when the sensing apparatus detects a triggering event. When the contact is made, LAN 410 can request emergency response unit 490 to control one or more devices associated with LAN 410. An observation device can allow emergency response unit 490 to observe and monitor a situation at location 400. An emergency response device can allow emergency response unit 490 to resolve the situation at location 400. Each of the sensing apparatus, observation devices, and the emergency response devices can have overlapping functions.

In step 504, firewall 440 can be built to protect LAN 410. As described above, firewall 440 can have one or more elements. Firewall 440 can have different levels of security. Also in step 504, database 480 associated with emergency response unit 490 can be populated with information. The information may be that which is available to database 380 as described above. In addition, the information may include information related to LAN 410 and its component systems, including the IP address of LAN server 430. Population of database 480 may be performed using one of several methods. For example, the information can be provided to database 480 by using computer system 421 via external computer network 370. Similarly, the information can be supplied using telephone system 428 via PSTN 106. Identity information such as a password to go through firewall 440 may be provided to database.

In step 506, the owner of LAN 410 can decide on how emergency response unit 490 can be authorized to access LAN 410 through a secured tunnel in firewall 440. For example, it could be decided that emergency response unit 490 must supply a password or a digital certificate authenticated by certificate authority 360 before access to LAN 410 is granted. Furthermore, it may be agreed upon that emergency response unit 490 will not be allowed to access LAN 410 unless one of the component systems associated with LAN 410 has contacted emergency response unit 490 first.

In step 508, a triggering event is detected at location 400. The triggering event may be a suspicious movement detected by one of the component systems associated with LAN 410. In step 510, the triggering event can be reported to emergency response unit 490 using one of several methods. For example, a telephone that is associated with telephone system 428 can be used to contact emergency response unit 490 through PSTN 106 in a POTS session. Similarly, the triggering event can be reported to emergency response unit 490 using a computer that is associated with computer system 421 through external computer network 370 in a VoIP session. Furthermore, a wireless telephone associated with telephone system 428 can be used to contact emergency response unit 490. In the preferred embodiment, LAN server 430 can be notified that emergency response entity 490 has been contacted about the triggering event.

In step 512, when emergency response unit 490 receives the report about the triggering event at location 400, emergency response unit 490 can consult database 480 to retrieve information associated with location 400. The information may comprise the password to access LAN 410, IP address of LAN server 430, and information related to the various component systems of LAN 410.

In step 514, emergency response unit 490 can initiate a communication session with LAN 410. The communication session can be initiated because emergency response unit 490 has the IP address of LAN server 430. In step 516, at firewall 440, emergency response unit 490 can be required to provide a proper form of authority. For example, emergency response unit 490 may be required to provide the password. Alternatively, emergency response unit 490 may be required to supply a digital certificate authenticated by certificate authority 360, before it can access LAN 410.

In step 518, when the identity of emergency response unit 490 is properly ascertained by firewall 440, either by using the password or the digital certificate, a secured tunnel through firewall 440 can be created. A communication session between emergency response unit 490 and LAN server 430 can be established using one of several communications protocols, including DCP and TCP. Preferably, emergency response unit 490 has exclusive control over the communication session.

In step 520, emergency response unit 490 can observe the situation at location 400. Using information retrieved from database 480, emergency response unit 490 can know which component system or systems associated with LAN 410 can be used as an observation device to monitor the situation.

Similarly, in step 522, emergency response unit 490 may use one or more of the component systems associated with LAN 410 as emergency response devices to resolve the situation. For example, if it was observed that a suspicious person is moving about within location 400, emergency response unit 490 may use a camera to identify the person. Furthermore, emergency response unit 490 may use a loudspeaker controlled by LAN server 430 to ask the person to leave location 400 immediately. Of course, emergency response unit 490 can also dispatch police officers to location 400, if warranted.

In step 524, the communication session can be terminated when the emergency situation is resolved. As mentioned above, preferably only emergency response unit 490 can terminate the communication session. The secured tunnel is shut as soon as the communication session is terminated, ending emergency response unit 490's access to LAN 410. LAN server 430 preferably has a display that can indicate whether the communication session is still active. If a second triggering event is detected, emergency response unit 490 must go through at least steps 514 and 516 before it can communicate with LAN 410 again.

Figure 6:
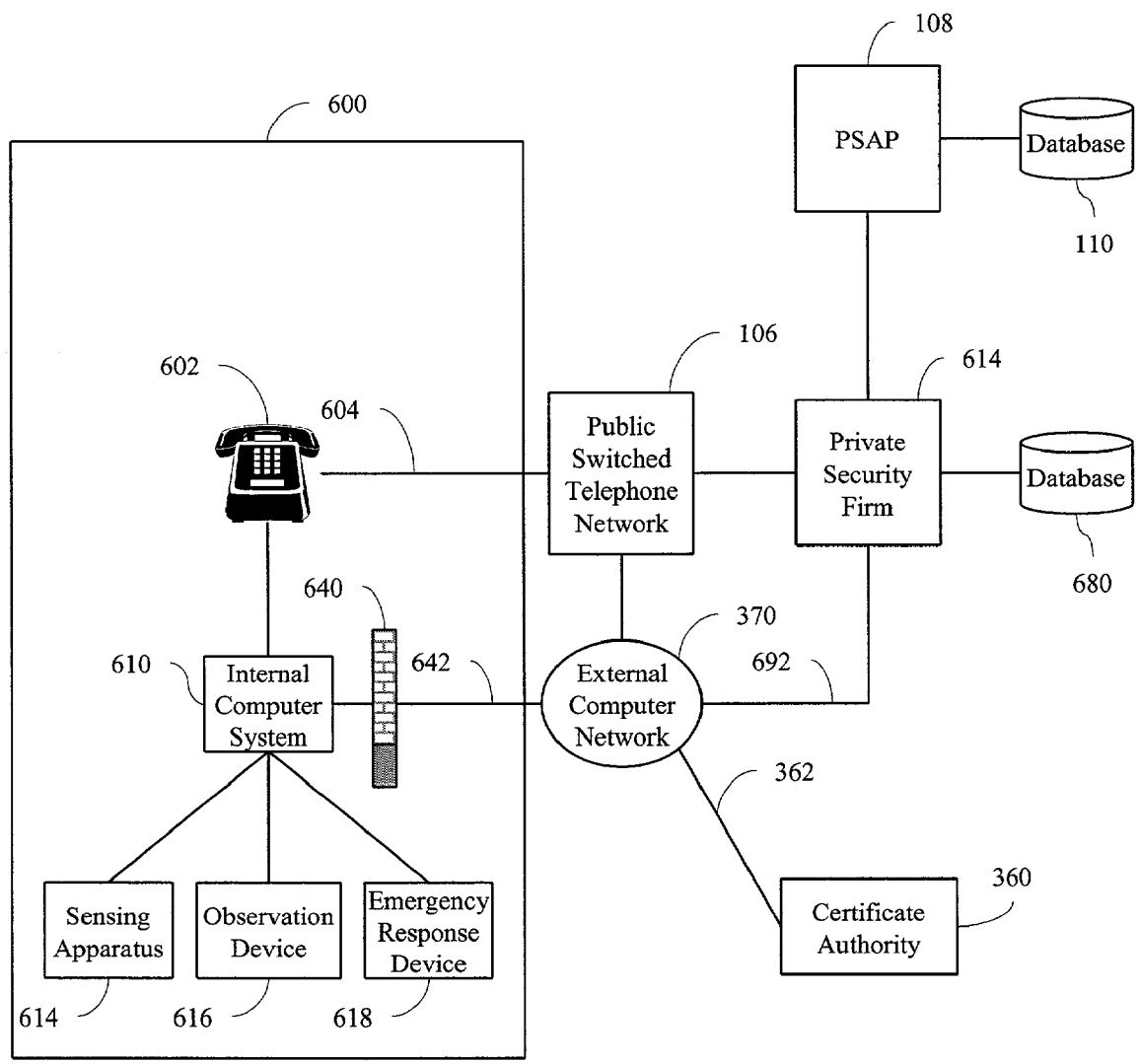
FIG. 6 is a schematic diagram showing the system architecture of a second preferred embodiment of the present invention.

FIG. 6 is a schematic diagram showing the system architecture of a second preferred embodiment of the present invention. In this embodiment, location 600 may be an office building of a business entity, a residence, a yacht, an automobile, or any location at which an internal computer system associated with at least one component system or device may be set up. CPE 602, telephone line 604, internal computer system 610, firewall 640, communication link 642, sensing apparatus 614, observation device 616, and emergency response device 618 are similar to corresponding elements shown in FIG. 3 and described above.

Sensing apparatus 614 can be used to detect a triggering event at location 600. Observation device 616 can be used to observe the situation associated with the triggering event at location 600. Emergency response device 618 can be used to resolve the situation. Each of sensing apparatus 614, observation device 616, and emergency response device 618 may be selected from the various components of video system 422, audio system 423, climate control system 424, fire alarm system 425, security system 426, and electrical system 427 as described above and shown in FIG. 4. For example, sensing apparatus 614 may be a thermostat associated with climate control system 424; observation device 616 may be a video camera associated with video system 422; and emergency response device 618 may be a sprinkler system associated with fire alarm system 425.

Internal computer system 610 is in communication with CPE 602, sensing apparatus 614, observation device 616, and emergency response device 618. Internal computer system 610 is protected by firewall 640, which can be similar to firewalls 340 and 440 described above.

When sensing apparatus 614 detects the triggering event, e.g., the temperature at location 600 has risen above a certain threshold, internal computer system 610 can report the triggering event to private security firm 614. The report to private security firm 614 can be made using telephone line 604 via PSTN 106. Internal computer system 610 may be adapted to initiate a communication session with private security firm 614 via external computer network 370 along communication links 642 and 692 when private security firm 614 is contacted using telephone line 604. Through the communication session, private security firm 614 can control one or more devices associated with internal computer system 610. Private security firm 614 preferably has exclusive control over the communication session. Private security firm 614 preferably can retrieve information related to the devices from database 680. Private security firm 614 can also communicate with PSAP 108 that has access to database 110.

Figure 7:
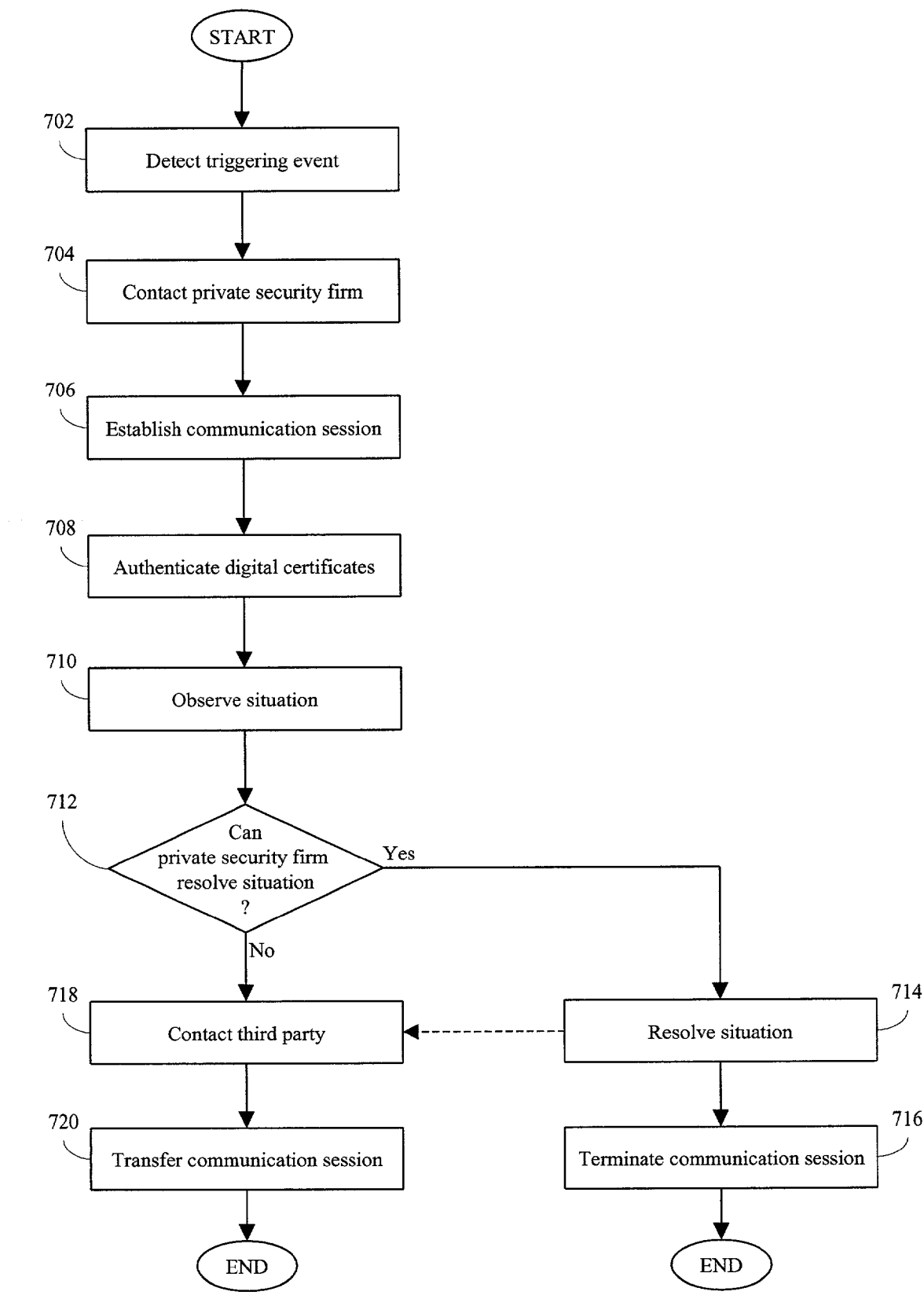
FIG. 7 is a flowchart illustrating the steps involved in using the second preferred embodiment of the present invention.

FIG. 7 is a flowchart illustrating the steps involved in using the second preferred embodiment of the present invention. In step 702, a triggering event is detected by sensing apparatus 614. The triggering event may be, for example, a temperature higher than a threshold that is associated with location 600. The triggering event could also be noise of a certain intensity, or a motion at a certain time of day.

In step 704, private security firm 614 is contacted to report the triggering event. The contact may be made manually, e.g., by a person dialing the telephone number of private security firm 614 using CPE 602. Preferably, the contact may also be made using a computer associated with internal computer system 610. Furthermore, private security firm 614 may be contacted using an e-mail. Private security firm 614 may have an IP address to which a report about the triggering event may be sent by internal computer system 610. In one embodiment, step 704 may not be a necessary step.

In step 706, a communication session between internal computer system 610 and private security firm 614 can be established. Internal computer system 610 can place a QoS (quality of service) priority call to private security firm 614. The establishment of the communication session may be accomplished through communication links 642 and 692 via external computer network 370. Internal computer system 610 and private security firm 614 can exchange digital certificates during the communication session. The identity of the parties can be authenticated by certificate authority 360 in step 708.

In step 710, after the parties have ascertained the identities of each other through the authentication process, private security firm 614 can observe the situation at location 600 using observation device 616. During the communication session, private security firm 614 may use the information in database 680 to operate observation device 616 to monitor the situation at location 600. For example, private security firm 614 may observe, through a camera, that a first person had fainted in the kitchen. Private security firm 614 may also observe that a second person is watching a movie in a bedroom, unaware of the first person's condition.

In step 712, private security firm 614 can evaluate whether it can resolve the situation on its own. If so, in step 714, private security firm 614 may resolve the situation using emergency response device 618. For example, private security firm 614 may use emergency response device 618, e.g., an intercom, through which private security firm 614 may alert the second person in the bedroom that the first person had fainted in the kitchen. Alternatively, private security firm 614 may use a different emergency response device, e.g., a sprinkler in the kitchen, to wake up the first person. The method can be modified so that if the situation cannot be successfully resolved in step 714, the process can go to step 718. The communication session may be terminated in step 716 by private security firm 614 after the situation at location 600 has been resolved, e.g., the first person has been awaken successfully and is observed to be in good health.

If, in step 712, private security firm 614 determined that it could not resolve the situation on its own, the process goes to step 718 in which a third party may be contacted by private security firm 614. The third party may be an emergency response unit, such as emergency response unit 490 described above. In step 720, the communication session can be transferred to the third party.

Figure 8:
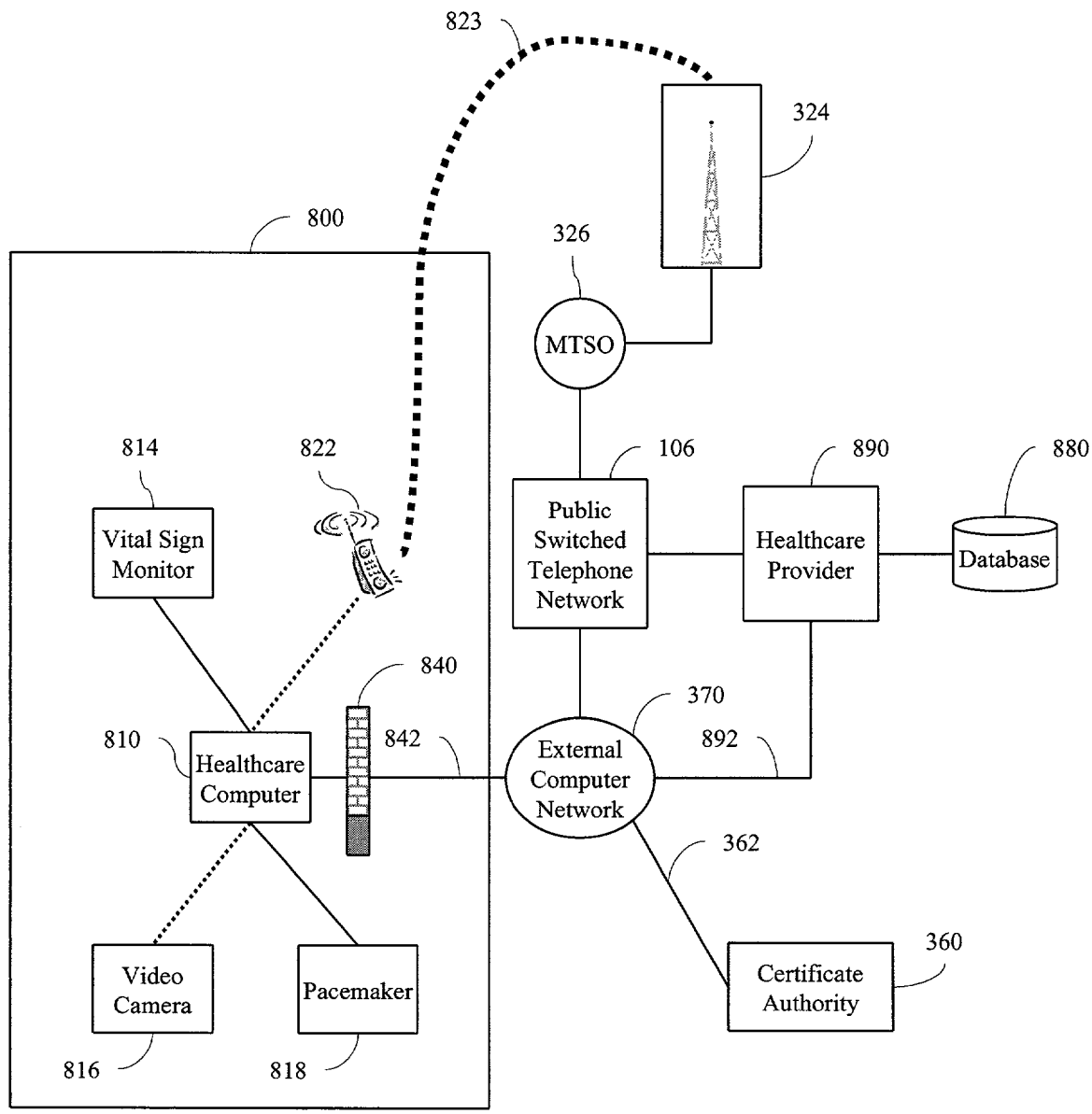
FIG. 8 is a schematic diagram showing the system architecture of a third preferred embodiment of the present invention.

FIG. 8 is a schematic diagram showing the system architecture of a third preferred embodiment of the present invention. In the third preferred embodiment, the present invention can be adapted to operate on Bluetooth-enabled devices and technologies. Information related to Bluetooth technology can be found in Bluetooth Protocol Architecture, Version 1.0 (Aug. 25, 1999), which is hereby incorporated by reference in its entirety.

Patient 800 can be a person with a health condition that requires constant 10*a* medical monitoring. Patient 800's pulse, blood pressure, blood oxygen saturation level, body temperature etc., may be taken or measured by vital sign monitor 814, which is preferably worn by patient 800 at all times. Vital sign monitor 814 can be adapted to communicate with healthcare computer 810. Healthcare computer 810 is preferably a small, portable computer that is Bluetooth compatible. Firewall 840 can be created using a combination of hardware and software as described above. Firewall 840 can be integrated as part of healthcare computer 810. Firewall 840 protects healthcare computer 810 from unauthorized access by others. A digital certificate issued to healthcare computer 810 can be stored in a memory of healthcare computer 810.

In addition to vital sign monitor 814, healthcare computer 810 can be associated with other component systems, including video camera 816 and pacemaker 818. Video camera 816 may be installed at a location where patient 800 normally spends most of his or her time. For example, video camera 816 may be installed in the bedroom of patient 800. Pacemaker 818, as known to one skilled in the art, can be surgically placed within the body of patient 800. Vital sign monitor 814, video camera 816, and pacemaker 818 are also preferably Bluetooth-enabled.

When vital sign monitor 814 detects a triggering event, vital sign monitor 814 can report the triggering event to healthcare computer 810. The triggering event may occur, for example, when the pulse of patient 800 drops below a certain threshold or when the body temperature rises above a certain limit. Healthcare computer 810, in turn, can communicate with healthcare provider 890 using wireless device 822. Wireless device 822 can be adapted to contact healthcare provider 890 when the triggering event is detected. Wireless device 822 may be a specialty item that can be designed or dedicated to notify healthcare provider 890 of patient 800's conditions. In another embodiment, wireless device 822 is preferable Bluetooth-enabled and can communicate with healthcare computer 810. In another embodiment, a person who observes that patient 800 requires help may contact healthcare provider 890 using wireless device 822, which can be a regular wireless telephone. Wireless device 822 can communicate with healthcare provider 890 through communication link 823, base station 324, MTSO 326, and PSTN 106.

Healthcare provider 890 preferably has information related to patient 800. The information is preferably stored in database 880, which is accessible by healthcare provider 890. The information may comprise the medical history of patient 800 and all information associated with healthcare computer 810, including those related to vital sign monitor 814, video camera 816, pacemaker 818, and wireless device 822. The information may also include a digital certificate issued to healthcare provider 890 that would enable healthcare provider 890 to pass through firewall 840 during a communication session. Healthcare provider 890 can operate one or more component systems associated with healthcare computer 810 through external computer network 370. Preferably, database 880 has PKI information for access to healthcare computer 880. For example, healthcare provider 890 can control pacemaker 818 during a communication session along communication links 892 and 842. Certificate authority 360, accessible using communication link 362, can provide authentication services to healthcare provider 890 and patient 800 to ensure that the communication session between healthcare provider 890 and healthcare computer 810 is a secured tunnel.

Figure 9:
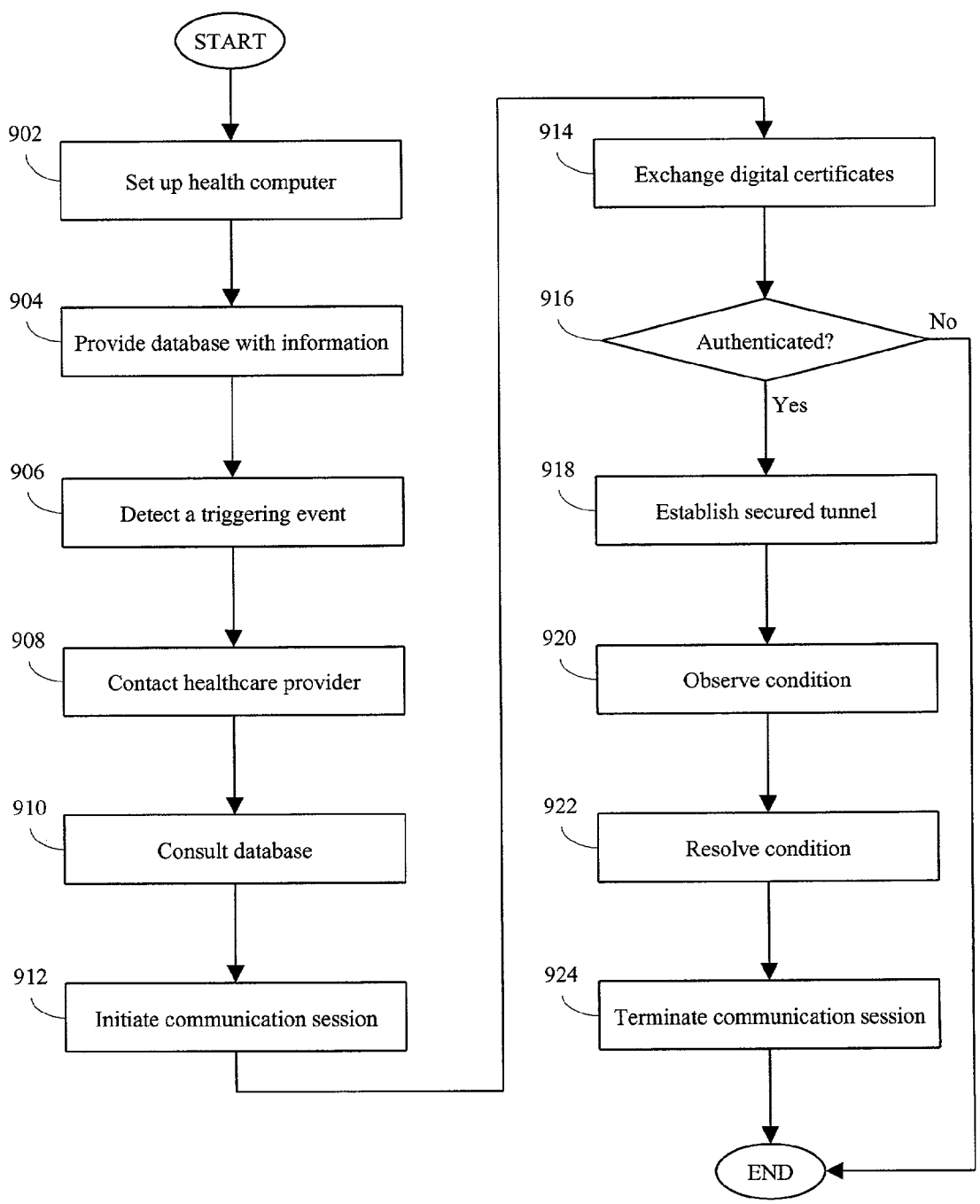
FIG. 9 is a flowchart illustrating the steps involved in using the third preferred embodiment of the present invention.

FIG. 9 is a flowchart illustrating the steps involved in using the third preferred embodiment of the present invention. In step 902, healthcare computer 810 and its associated devices can be set up as described above. In step 904, information regarding patient 800 is provided to database 880. The information can comprise the medical records of patient 800 and operating instructions of the various component systems associated with healthcare computer 810. Database 880 can also be populated with information related to how a secured tunnel through firewall 840 may be established.

In step 906, when a triggering event occurs, vital sign monitor 814 can detect the triggering event. In step 908, healthcare provider 890 can be contacted using wireless device 822. In step 910, healthcare provider 890 can consult database 880 to obtain information about patient 800. In step 912, healthcare provider 890 can initiate a communication session with healthcare computer 810 via external computer network 370.

In step 914, healthcare provider 890 and healthcare computer 810 can exchange their digital certificates. In step 916, the digital certificates are authenticated. Authentication of the digital certificates can be done by certificate authority 360. The authentication process ensures that healthcare provider 890 is treating the right patient and that patient 800 is treated by his or her healthcare provider.

If, in step 916, the digital certificates are not authenticated, the process ends and healthcare provider 890 is denied access to healthcare computer 810. But if in step 916 both digital certificates are authenticated, a communication session between healthcare provider 890 and healthcare computer 810 is established in step 918. The communication session is preferably a secured tunnel through firewall 840. In step 920, healthcare provider 890 can observe the condition of patient 810. The condition may be observed using one or more of vital sign monitor 814 and video camera 816. In step 922, if warranted, healthcare provider can control an emergency response device, such as pacemaker 816, to help improve the medical condition of patient 800. The communication session is terminated in step 924 when healthcare provider 890 is satisfied with the condition of patient 800. Preferably, control of the communication session rests exclusively with healthcare provider 890.

The foregoing disclosure of embodiments and specific examples of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

We claim:

1. A system for enabling an outside entity to control devices at a location, the system comprising:
    an interface to a communications network, the communications network adapted to communicate with an internal computer system associated with the location, the internal computer system being associated with a sensing apparatus that can detect a triggering event at the location, the internal computer system being further associated with a device at the location that can be controlled by the outside entity via the internal computer system; and
    logic configured to receive an indication associated with an occurrence of the triggering event;
    wherein responsive to the sensing apparatus detecting the triggering event, the internal computer system establishes a voice-over-Internet-protocol communication session with the outside entity via a communications network in communication with the location, the communications network including at least one of a public switched telephone network, the Internet and a wireless communication link,
    wherein the triggering event activates an ability to allow control of the device at the location to be assigned to the outside entity to obtain data from the device to the outside entity;
    further comprising logic configured to transfer a session to a second outside entity;
    wherein the second outside entity is a public safety answering point.

2. The system of claim 1, wherein at least a portion of the communications session is secure.

3. The system of claim 2, wherein the security utilizes a digital certificate.

4. The system of claim 2, wherein the security utilizes X.509 standards.

5. A method for enabling an outside entity to control devices at a location, the method comprising:

associating at least one communications device with an internal computer system at the location;

associating a device at the location with the an internal computer system at the location;

receiving communication of a triggering event associated with the location to the outside entity via a communications network in communication with the location, the communications network including at least one of a public switched telephone network, the Internet and a wireless communication link;

utilizing a voice-over-Internet-protocol communication session between the internal computer system and the outside entity over an external computer network, wherein the communication session is initiated by the internal computer network;

taking control of the communication session by the outside entity, wherein the triggering event activates an ability to allow control of the device at the location to be assigned to the outside entity to obtain data from the device to the outside entity;

transferring a communication session to a second outside entity;

wherein the second outside entity is a public safety answering point.

6. The method of claim 5, wherein at least a portion of the communications session is secure.

7. The method of claim 5, wherein the at least one communications device is wireless.

8. The method of claim 5, wherein the location is associated with a moving object.

9. The method of claim 8, wherein the moving object is a vehicle.

10. The method of claim 9, wherein the vehicle is an automobile.

11. A monitoring and control apparatus at a location, the apparatus comprising:

an internal computer system associated with the location;

an wireless interface to a sensing element to monitor a location;

a communication processor to communicate with an outside entity via a communications network wherein the communications utilizes a secure tunnel and the outside entity is authenticated;

a control module allowing an outside entity to control the operations of the devices at the location associated with a local area network upon detection of a triggering event at the location by the sensing element;

wherein the devices include VoIP capable devices and a television at the location.

12. The apparatus of claim 11, wherein the communication utilizes quality of service.

13. The apparatus of claim 11, uses multiple levels of security.

14. The apparatus of claim 11 wherein the communications conveys multimedia information.

\* \* \* \* \*